(12) United States Patent
Yukawa et al.

(10) Patent No.: US 7,681,613 B2
(45) Date of Patent: Mar. 23, 2010

(54) PNEUMATIC TIRE AND NOISE DAMPER ASSEMBLY

(75) Inventors: Naoki Yukawa, Kobe (JP); Keiichi Nakadera, Kobe (JP)

(73) Assignee: Sumitomo Rubber Industries, Ltd., Kobe-shi (JP)

(*) Notice: Subject to any disclaimer, the term of this patent is extended or adjusted under 35 U.S.C. 154(b) by 601 days.

(21) Appl. No.: 11/607,868

(22) Filed: Dec. 4, 2006

(65) Prior Publication Data

US 2007/0131326 A1 Jun. 14, 2007

(30) Foreign Application Priority Data

Dec. 13, 2005 (JP) .............................. 2005-359334

(51) Int. Cl.
*B60C 5/00* (2006.01)
*B60C 5/12* (2006.01)
*B60C 19/00* (2006.01)

(52) U.S. Cl. ...................................... 152/450; 152/510

(58) Field of Classification Search ................. 152/450, 152/510; 425/812
See application file for complete search history.

(56) References Cited

U.S. PATENT DOCUMENTS 2,851,729 A 9/1958 Kalkofen
3,170,195 A * 2/1965 Knox ..................... 425/812 X
6,755,483 B2 6/2004 Yukawa et al.
2005/0098251 A1 5/2005 Yukawa
2005/0205183 A1* 9/2005 Yukawa ..................... 152/450

FOREIGN PATENT DOCUMENTS

EP 1 510 366 A1 3/2005
EP 1 529 665 A1 5/2005

\* cited by examiner

*Primary Examiner*—Adrienne C Johnstone
(74) *Attorney, Agent, or Firm*—Birch, Stewart, Kolasch & Birch LLP

(57) ABSTRACT

A pneumatic tire and noise damper assembly comprises a pneumatic tire manufactured by vulcanization using an expandable bladder for molding an inner surface of the tire, the bladder with at least one vent groove extending on its outer surface, the inner surface of the tire being provided with at least one projecting stripe molded by the vent groove of the bladder, and a noise damper being attached to the inner surface of the tire and extending in the circumferential direction of the tire, wherein the projecting stripe comprises at least one first projecting stripe extending in an adhesion region to which the noise damper is attached, and the first projecting part has a height of from 0.2 to 1.0 mm, a width of from 0.4 to 1.6 mm and an virtual section area of from 0.08 to 1.00 mm$^2$.

10 Claims, 7 Drawing Sheets

(Unit : mm)

PNEUMATIC TIRE AND NOISE DAMPER ASSEMBLY

BACKGROUND OF THE INVENTION

1. Field of the Invention

The present invention relates to a pneumatic tire and noise damper assembly which comprises a pneumatic tire and a noise damper made of a spongy material being fixed to an inner surface of the tire, and more particularly, to the assembly for preventing molding failure of the tire without deteriorating adhesion of the noise damper.

2. Background Art

In recent years, there is proposed a pneumatic tire and noise damper assembly which comprises a pneumatic tire and a noise damper made of a spongy material and being attached to the inner surface of the tire. Such an assembly can suppress cavity resonance in the tire cavity, thereby reducing a road noise.

As shown in FIG. 9(A), when the pneumatic tire (a) is vulcanized and molded by a tire mold b, an inner surface (ai) of the tire (a) is pressed by a bladder c which is expanded by charging heat media such as vapor therein. Therefore, an outer surface (ao) of the tire (a) is strongly pushed against the tire mold b, and the inner surface (ai) of the tire is molded by the bladder c. In order to efficiently discharge the air between the tire (a) and the bladders c to the outside, a plurality of vent grooves (not shown) extending in the radial direction, for example, are provided on the outer surfaces of the bladders c. Therefore, as shown in FIG. 9(B), the vent grooves of the bladders c are reversed and transferred on the inner surface (ai) of the vulcanized tire (a) as a plurality of projecting stripes d.

Here, if the noise damper is attached to a region including the projecting stripe d, there is an adverse possibility that the adhesion is deteriorated because the noise damper can not sufficiently fit to uneven surface of the projection d. In order to enhance the adhesion between the inner surface (ai) of the tire and the noise damper, it is proposed to eliminate the vent grooves from the outer surfaces of the bladders c so that the projecting stripes d are not molded on the inner surface (ai) of the tire.

However, if all of the vent grooves are eliminated from the of the bladders c, air between the cavity (ai) and the bladders c can not sufficiently be discharged, and the molding failure of the tire would be produced.

SUMMARY OF THE INVENTION

It is a main object of the present invention to provide a pneumatic tire and noise damper assembly capable of preventing molding failure of the tire without deteriorating adhesion of the noise damper.

According to the present invention, a pneumatic tire and noise damper assembly comprises a pneumatic tire manufactured by vulcanization using an expandable bladder for molding an inner surface of the tire, the bladder having at least one vent groove extending on its outer surface, the inner surface of the tire being provided with at least one projecting stripe molded by the vent groove of the bladder, and a noise damper being attached to the inner surface of the tire and extending in the circumferential direction of the tire, wherein the projecting stripe comprises at least one first projecting stripe extending in an adhesion region to which the noise damper is attached, and the first projecting stripe has a height of from 0.2 to 1.0 mm, a width of from 0.4 to 1.6 mm and an virtual section area of from 0.08 to 1.00 mm$^2$.

DESCRIPTION OF THE PREFERRED EMBODIMENTS

Figure 1:
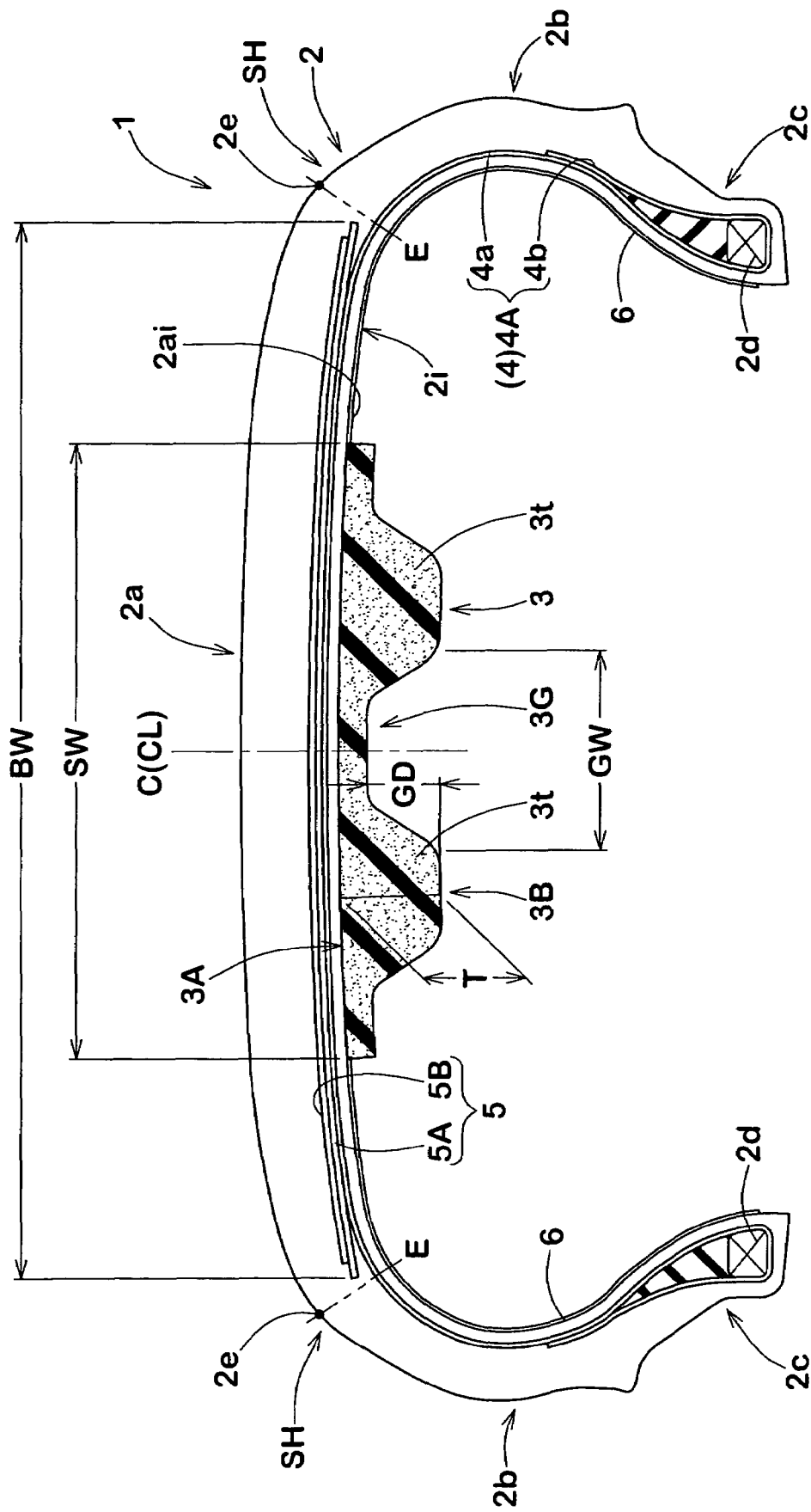
FIG. 1 is a cross sectional view showing an embodiment of a pneumatic tire and noise damper assembly of the present invention.

Embodiments of the present invention will now be described in detail in conjunction with the accompanying drawings.

In the drawings, a pneumatic tire and noise damper assembly 1 according to the present invention comprises a pneumatic tire 2 with a toroidal body and a noise damper 3 being attached to the inner surface 2$i$ of the tire 2.

The pneumatic tire 2 comprises a tread portion 2$a$, a pair of bead portions 2$c$ each with a bead core 2$d$ therein, and a pair of sidewall portions 2$b$ extending between the tread portion 2$a$ and the bead portion 2$c$. In this embodiment, the tire 2 is showed as a tubeless tire for passenger car with the inner surface 2$i$ made of a gas-impermeable rubber.

The pneumatic tire 2 further comprises a carcass 4 and a belt 5 disposed radially outside the carcass 4 in the tread portion 2$a$.

The carcass 4 comprises at least one carcass ply 4A of organic fiber cords which comprises a main body 4$a$ extending between the bead cores 2$d$, 2$d$, and a pair of turnup portions each turned up around the bead core 2$d$ from the axially inside to the outside of the tire.

In this embodiment, the belt 5 comprises two cross belt plies 5A and 5B of parallel cords laid at an angle of from 10 to 30 degrees with respect to the tire equator C. For the belt cords, steel cords, and high modulus organic fiber cords such as aramid, rayon and like can be used.

Here, the internal structure of the tire 2 may be suitably changed based on the category of the tire.

The noise damper 3 is made of spongy material and extends in the circumferential direction of the tire. Here, the spongy material means not only a foamed elastomer or plastic of an open-cell or closed-cell type but also shaped intertangled fiber such as synthetic fiber, plant fiber and animal fiber. In this embodiment, open-cell type poly-urethane foam is used.

Since the spongy material mention above has high vibration isolation ability and sound absorption ability, it can efficiently absorb vibrational energy in the cavity i of the tire 2. As a result, the resonance of the cavity i of the tire 2 is suppressed, and road noise becomes smaller. Further, since the spongy material can easily be shrunk, bent and deformed, it does not hinder the steering stability of the tire 2. Further, since the spongy material has a small specific gravity as compared with a solid rubber, the porous material does not deteriorate the weight balance of the tire. AS for the specific gravity of the spongy material, it is preferably set in the range of from 0.014 to 0.052.

As to the spongy material, synthetic resin sponge such as ether-based polyurethane sponge, ester-based polyurethane sponge and polyethylene sponge, and rubber sponge such as chloroprene rubber sponge (CR sponge), ethylene propylene rubber sponge (EPDM sponge) and nitrile rubber sponge (NBR sponge) are preferably used. In view of sound-reduction performance, light-weighted performance, foaming adjustability, endurance and the like, urethane-based sponge and polyethylene-based sponge such as ether-based polyurethane sponge are especially preferable.

The air filled in the tire cavity i may include water (moisture) in many cases. Thus, ether polyurethane sponge which is strong for hydrolytic degradation is preferable as the spongy material. Also, in order to prevent absorbing of water, the spongy material is preferably provided with water repellency. It is further preferable that the spongy material has mildew-proof. Further, in order to prevent toxic gas from being generated when the tire is incinerated, it is preferable that the spongy material does not contain halogen atom.

The volume of the noise damper 3 is preferably set in the range of from 0.4 to 20% of the volume of the cavity I of the tire 2. With this, it may be possible to reduce the road noise at least 2 dB. More preferably, the volume of the noise damper 3 is set in the range of not less than 1%, more preferably not less than 2%, still preferably not less than 4%, but not more than 10% of the volume of the tire cavity i.

In this specification, the expression "volume of the noise damper" means the apparent entire volume of the noise damper including inside bubbles. Further, the "volume of the tire cavity" $V1$ is defined under the standard condition by the following approximate equation:

$$V1 = A \times \{(Di-Dr)/2 + Dr\} \times \pi$$

where

"A" is the cross sectional area of the tire cavity i,

"Di" is the maximum outer diameter of the tire cavity i, and

"Dr" is the wheel rim diameter.

The above-mentioned standard condition is such that the tire 2 is mounted on a standard wheel rim and inflated to a standard pressure but loaded with no tire load.

The standard rim is the "standard rim" specified in JATMA, the "Measuring Rim" in ETRTO, the "Design Rim" in TRA or the like.

The standard pressure is the "maximum air pressure" in JATMA, the "Inflation Pressure" in ETRTO, the maximum pressure given in the "Tire Load Limits at various cold Inflation Pressures" table in T&RA of the like. In case of passenger car tires, however, 200 kPa is used as the standard pressure.

The noise damper 3 has a bottom surface 3A with a smooth surface fixed to the inner surface 2*i* of the tire 2 and upper surface 3B facing to the tire cavity i. With this, the noise damper 3 does not move freely when tire 2 is running.

Preferably, the noise damper 3 is fixed to a tread region 2*ai* of the inner surface 2*i* of the tire 2. Here, "tread region" 2*ai* is an inside region of the belt with a width equal to the width BW of the belt 5. A centrifugal force when the vehicle runs at high speed acts outward in the radial direction of the tire. Thus, the tire 2 and the noise damper 3 fixed to the tread region 2*ai* are strongly pushed against each other by the centrifugal force, thereby preventing the upper surface 3B from being peeled off. In this embodiment, the center of the width SW of the noise damper 3 is arranged onto the tire equator C.

The maximum thickness T of the noise damper 3 is not limited to, but is preferably not more than 35 mm, more preferably not more than 30 mm, further preferably not more than 25 mm. If the maximum thickness T of the damper 3 becomes too large, the damper 3 may be broken by contacting with a tire lever which may be used for mounting the tire on a wheel rim. On the other hand, if the maximum thickness T of the damper 3 becomes too small, the effect for absorbing the sound energy in the tire cavity tends to decrease. In this point of view, the maximum thickness T of the damper 3 is preferably not less than 10 mm, and more preferably not less than 15 mm.

In order to stabilize the position of the noise damper 3, the width SW of the noise damper 3 is preferably Larger than the maximum thickness T thereof. Especially, the width SW of the noise damper 3 is preferably not less than 50 mm, more preferably not less than 70 mm, further preferably not less than 85 mm, but an upper limit thereof is preferably not more than 150 mm, more preferably not more than 130 mm and further preferably not more than 120 mm.

In this embodiment, the cross section shape of the noise damper 3 is substantially continued in the circumferential direction of the tire except for the circumferential edges thereof. The cross section shape of the noise damper 3 is not especially limited, but preferably rectangular shape, trapezoidal shape, triangular shape, nose shape, semi-circular shape and the like are suitable. The cross section shape of the noise damper 3 may be suitably designed based on productivity, durability, and the load noise reduction effect thereof.

The especially preferable cross section shape of the noise damper 3 is laterally symmetric with respect to a center line CL (the center line CL matches with the tire equator C in this embodiment) of the width SW, and the cross section includes (total two) projecting parts 3*t* projecting toward the tire cavity i and provided on both sides (one each) of the center line CL as shown in FIG. 1.

Further, the noise damper 3 is provided with one groove 3G extending in the circumferential direction of the tire on the side of the upper surface 3B and between the projecting parts 3*t*. With this, the upper surface 3B of the noise damper 3 is formed into an uneven surface so that a surface area of the noise damper 3 facing the tire cavity is increased. Accordingly, the noise damper 3 comes into contact with more air so that the cavity resonance energy is efficiently absorbed. Further, the increasing of the surface area of the noise damper improves the radiation performance of the noise damper 3, and it is possible to prevent the tire from being thermally destroyed.

In order to further improve the mention-above effect, it is preferable that the depth GD of the groove 3G is not less than 20% of the maximum thickness T of the noise damper 3, and more preferably not less than 30%, the upper limit is not more than 95%, more preferably not more than 90%, and more preferably not more than 80%. Further, the maximum width GW of the groove 3G is preferably not less than 15% of the width SW of the noise damper 3, more preferably not less than 25%, and the upper limit is not more than 70%, and more preferably not more than 45%.

Figure 2:
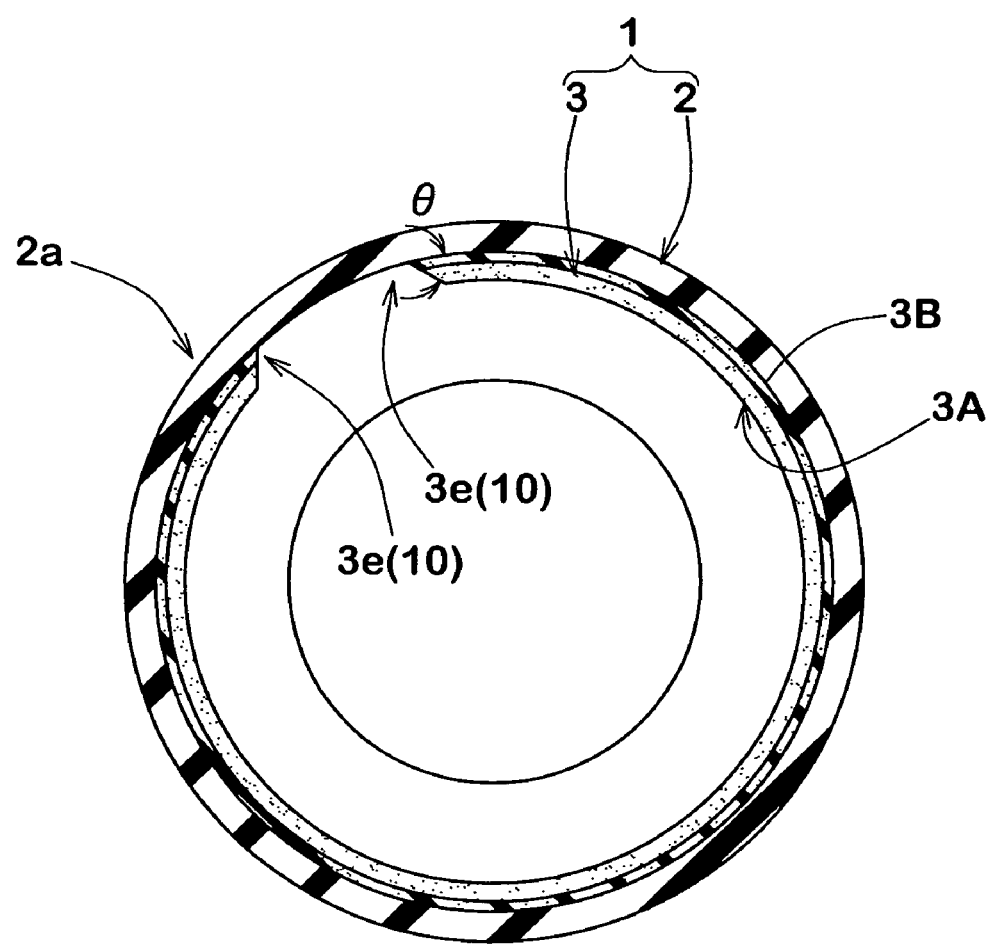
FIG. 2 is a circumferential sectional view of FIG. 1 taken along a tire equator.
Figure 3:
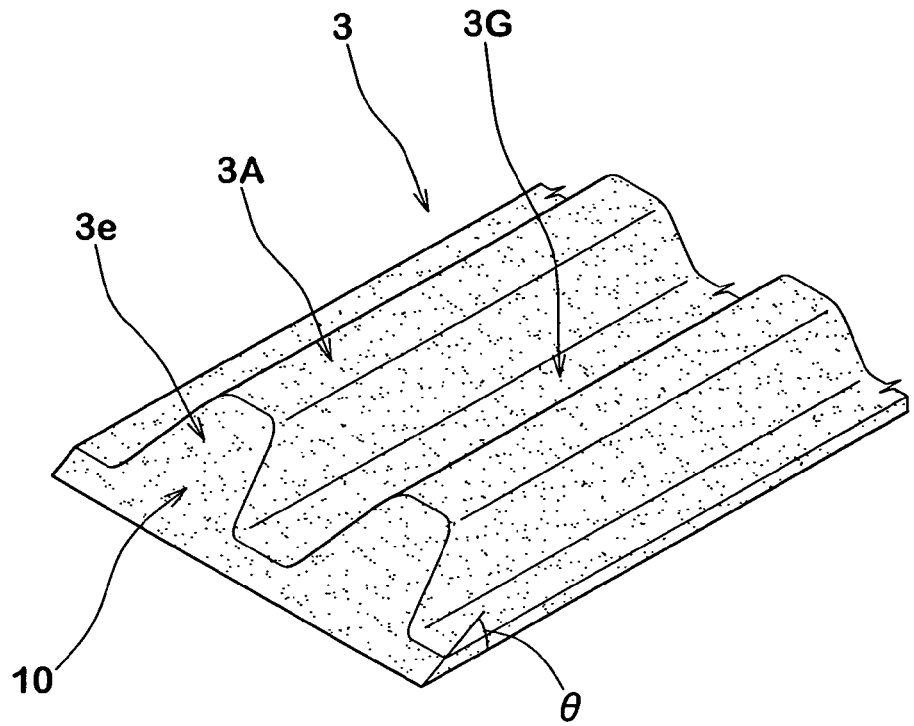
FIG. 3 is a perspective view showing an embodiment of a circumferential edge of a noise damper.
Figure 4:
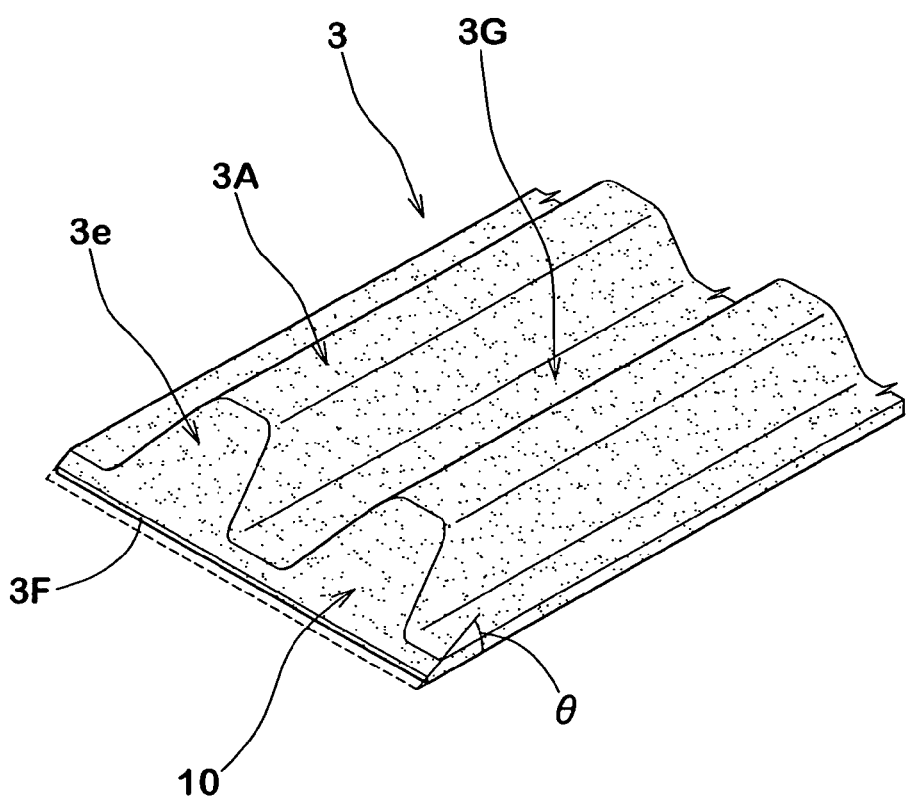
FIG. 4 is a perspective view showing another embodiment of a circumferential edge of the noise damper.

AS shown in FIGS. 2 and 3, both ends 3e and 3e of the noise damper 3 in the circumferential direction is formed by a tapered portion 10 whose thickness is gradually reduced toward the end in the circumferential direction. An angle theta of the tapered portion 10 sandwiched between the bottom surface 3A and the upper surface 3B is an acute angle, and mass of the each end 3e and 3e of the noise damper 3 is reduced as compared with the other portion. With this, concentration of stress on the adhesive surfaces of the both ends 3e of the noise damper 3 can be reduced. To further enhance this effect, it is preferable that the angle theta of the tapered portion 10 is in a range of from 15 to 70 degrees. As shown in FIG. 4, an acute tip end of the tapered portion 10 may have an end surface 3F which is cut perpendicularly to the bottom surface 3A.

The noise damper 3 is fixed to the inner surface 2i of the tire 2 by adhesive or double-coated adhesive tape for example.

Suitable examples of the adhesive are a soluble type adhesive in which synthetic rubber is dissolved in organic solvent or synthetic rubber-based liquid adhesive such as latex type which is dispersed in water.

Examples of the double-coated adhesive tape are a sheet base material such as weave is formed at its both surface with adhesive layer, tapes made of only adhesive layer without using the basic material, or various tapes. In the embodiment, the former double-coated adhesive tape is used. In the embodiment, a double-coated adhesive tape having a base material is used. Such a double-coated adhesive tape is especially preferable because unevenness of the inner surface 2i is absorbed by deformation of the base material thereof, and adhesion is enhanced as a result.

Figure 5:
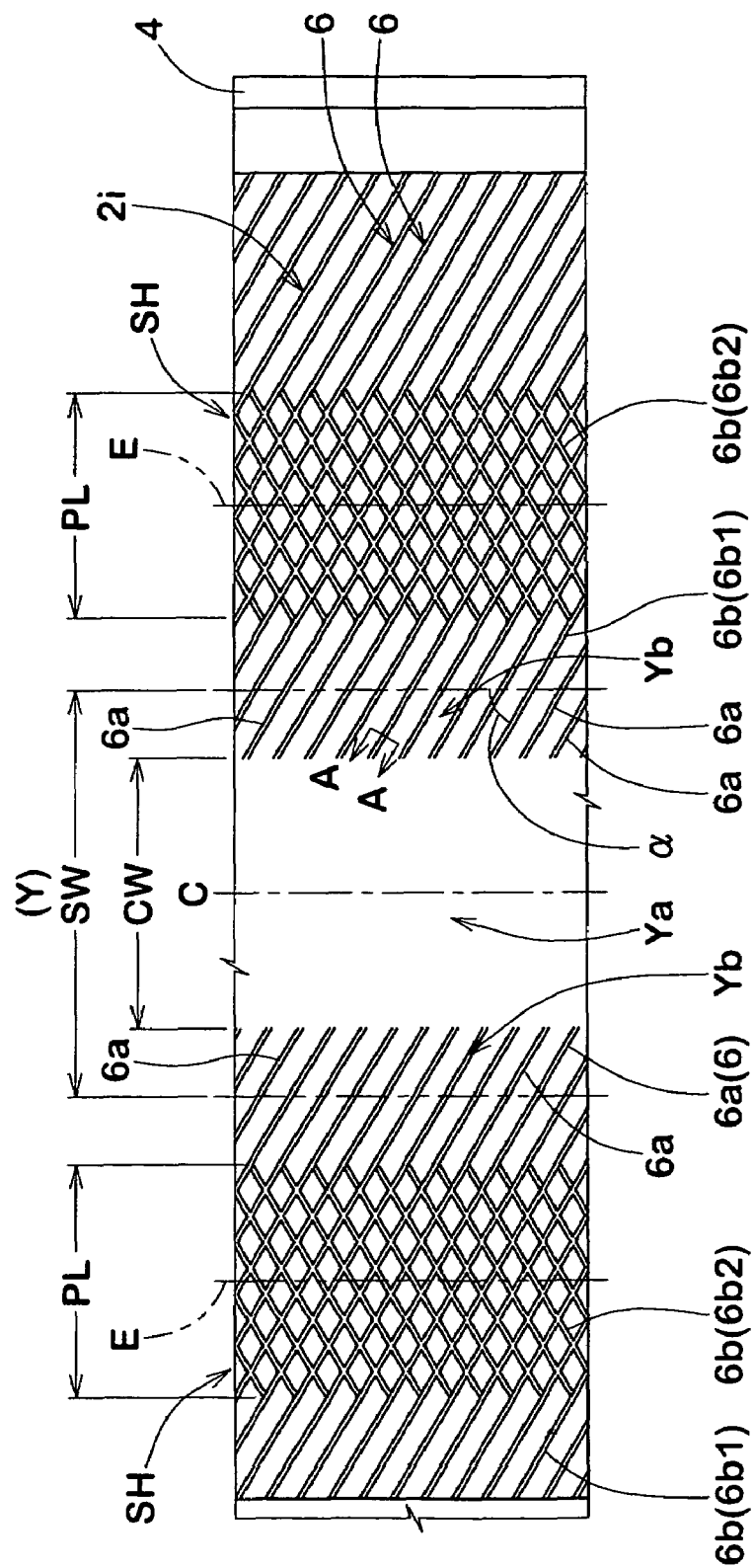
FIG. 5 is a development view showing an inner surface of the tire.
Figure 6:
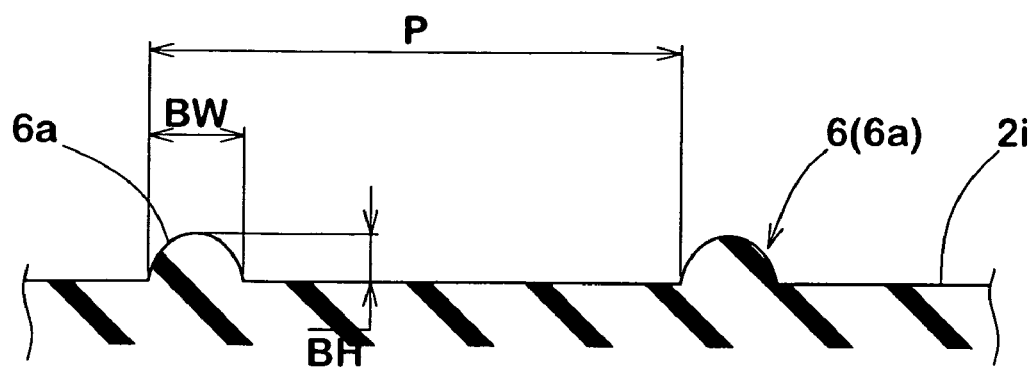
FIG. 6 is a cross sectional view taken along the line A-A of FIG. 5.

FIG. 5 is a development view of the pneumatic tire 2 as viewed from the inner surface 2i thereof. FIG. 6 is a cross sectional view taken along the line A-A in FIG. 5. The tire 2 is manufactured by vulcanization using an expandable bladder for molding an inner surface of the tire, the bladder has at least one, preferably a plurality of vent grooves extending on its outer surface as described above. Accordingly, the inner surface 2i of the tire 2 is provided with a plurality of projecting stripes 6 molded by the vent grooves of the bladder.

In this embodiment, the projecting stripe 6 comprise a plurality of first projections 6a extending across an adhesion region Y of the inner surface 2i to which the noise damper 3 is fixed, and a plurality of second projecting stripes 6b extending outer regions of the adhesion region Y.

The first projecting stripes 6a are preferably set as small as possible to prevent adhesion of the noise damper 3 from being deteriorated. However, if the first projecting stripes 6a are too small, air remains between the bladders and the inner surface 2i of the tire when the tire is vulcanized, and molding failure such as a dent of the inner surface 2i would be generated.

From such a viewpoint, the height BH of the first projecting stripe 6a is set not less than 0.2 mm, and more preferably not less than 0.3 mm. An upper limit of the height BH is set not more than 1.0 mm, and more preferably not more than 0.8 mm. Similarly, the width BW of the first projecting stripe 6a is set not less than 0.4 mm, and more preferably not less than 0.6 mm. It is preferable that an upper limit of the width BW is set not more than 1.6 mm, and more preferably not more than 1.4 mm. A virtual cross-sectional area obtained by the product (BH×BW) of the height BH and the width BW is set not less than 0.08 $mm^2$, and more preferably not less than 0.3 $mm^2$. It is preferable that an upper limit of the area is set not more than 1.00 $mm^2$, and more preferably not more than 0.8 $mm^2$.

A disposing pitch P of the first projecting stripes 6a is not especially limited, but if the pitch P is too small, the adhesion of the noise damper 3 would be deteriorated, and if the pitch P is excessively large, there is an adverse possibility that the molding failure of the tire 2 would be produced. From such a viewpoint, the pitch P of the first projecting stripes 6a is not less than 7 mm, more preferably not less than 9 mm. An upper limit of the pitch P is preferably set not more than 30 mm, more preferably not more than 20 mm. In this case, the pitch P may be variable or constant.

Further, the first projecting stripes 6a are inclined at angle alpha of from 30 to 90 degrees with respect to the circumferential direction of the tire. If the angle alpha is less than 30 degrees, since the length of the first projecting stripe 6a is increased, the adhesion failure between the noise damper 3 and the tire 2 tends to be produced. Preferably, the angle alpha is not less than 40 degrees, and more preferably not less than 45 degrees.

The cross section shape of the first projecting stripe 6a is not especially limited, but various shapes such as a rectangular shape, a semi-circular shape and a triangular shape are employed. Preferably, as shown in FIG. 6, the width BW of the stripe 6a is reduced as the height BH is increased to enhance the pulling out easiness of the bladder from the inner surface 2i of the tire 2.

In this embodiment, the adhesion region Y of the inner surface 2i comprises a center region Ya which is formed a smooth surface with no projecting stripes 6, and a pair of side regions Yb on both sides of the center region Ya being provided with only the first projecting stripes 6a. It is preferable that the center region Ya has a width CW of at least 20% and less than 100% of the fixing region Y in the axial direction of the tire.

As results of various experiments of the present inventors, it was found that if the width CW of the center region Ya becomes less than 20% of the width SW of the adhesion region Y, the adhesion of the noise damper 3 tends to be deteriorated, and if the center region Y does not include the side parts Yb, the molding failure during vulcanization is prone to be produced. From such a viewpoint, it is preferable that the width CW of the center region Ya is not less than 30% of the width SW of the adhesion region Y, and more preferably not less than 40%. It is preferable that its upper limit of the width CW is not more than 95% and more preferably not more than 90% of the width SW.

The second projecting stripes 6b extend from both outer ends of the adhesion region Y toward the bead portions 4. In this embodiment, the second projecting stripe 6b has the same cross section shape as that of the first projecting stripe 6a, but since the second projecting stripe 6b does not influence on adhesion of the noise damper 4, its virtual cross-sectional area can be set greater than that of the first projecting stripe 6a to enhance the molding properties of the tire 2.

Each of the second projecting stripes 6b includes a main projecting stripe 6b1 connected to the first projecting stripe 6a and extending to the bead portion 4, and a subsidiary projecting stripe 6b2 which extends in a direction intersecting with the main projecting stripe 6b1 and which is shorter than the main projecting stripe 6b1.

AS shown in FIG. 1, the subsidiary projecting stripe 6b2 is provided, for example, in each tread shoulder region SH including a normal E standing on a tread contacting end 2e. In the inner surface 2i of the tread shoulder region SH, variation in profile is greater than that in the other portions. Accordingly, since the air between the inner surface 2i and the bladder is prone to remain in the tread shoulder region SH, molding failure is especially easily produced. Therefore, in order to further prevent the molding failure, the main projecting stripe 6b1 and the subsidiary projecting stripe 6b2 are preferably formed in the tread shoulder region SH.

In other words, the pneumatic tire 2 of this present embodiment is vulcanized using the bladders (not shown) with vent grooves forming the main projecting stripe 6b1 and the subsidiary projecting stripe 6b2. The subsidiary projecting stripes 6b2 are formed at the same pitch as that of the main projecting stripes 6b1, and the angle alpha of inclination with respect to the circumferential direction of the tire is substantially the same as that of the main projecting stripe 6b1 but the inclination direction is opposite. According to such a pneumatic tire 2, the molding failure at the time of vulcanization is more reliably prevented.

The tread contacting end 2e is a ground-contacting end when a standard load is applied in the standard condition and the tread portion 2a is grounded onto a flat surface at a camber angle of 0 degree. Further, the "standard load" is the "maximum load capacity" in JATMA, 88% of the "Load Capacity" in ETRTO, the maximum value given in the above-mentioned table in TRA or the like.

The developing length PL of the subsidiary projecting stripe 6b2 in the axial direction of the tire is not especially limited, but if the developing length PL is too small, the effect for preventing the molding failure in the shoulder portion SH is prone to be deteriorated, and if the developing length PL is excessively long, the effect is saturated and there is a tendency that the mold cost for working the bladders is increased. From such a viewpoint, the developing length PL is preferably not less than 30% of the width SW of the noise damper 3 and more preferably not less than 50%, and its upper limit is preferably not more than 90% and more preferably, not more than 70% of the width SW of the noise damper 3.

Although the preferred embodiments of the present invention have been described in detail, the invention is not limited to the embodiments, and the invention can variously be modified and carried out.

Comparative Test:

In order to confirm the effect of the present invention, a plurality of pneumatic tire and noise damper assemblies were manufactured based on the specification shown in Table 1. Although the pattern of the projecting stripes formed by the bladder is based on FIG. 5, tires having no subsidiary projecting stripes were also prototyped. And then, the molding properties of the pneumatic tires, durability of the noise dampers and adhesion were tested. The common specifications are as follows.

Size

Tire size: 215/45ZR17 87W
Width of belt: 166 mm
Rim size: 15×6 JJ

Figure 7:
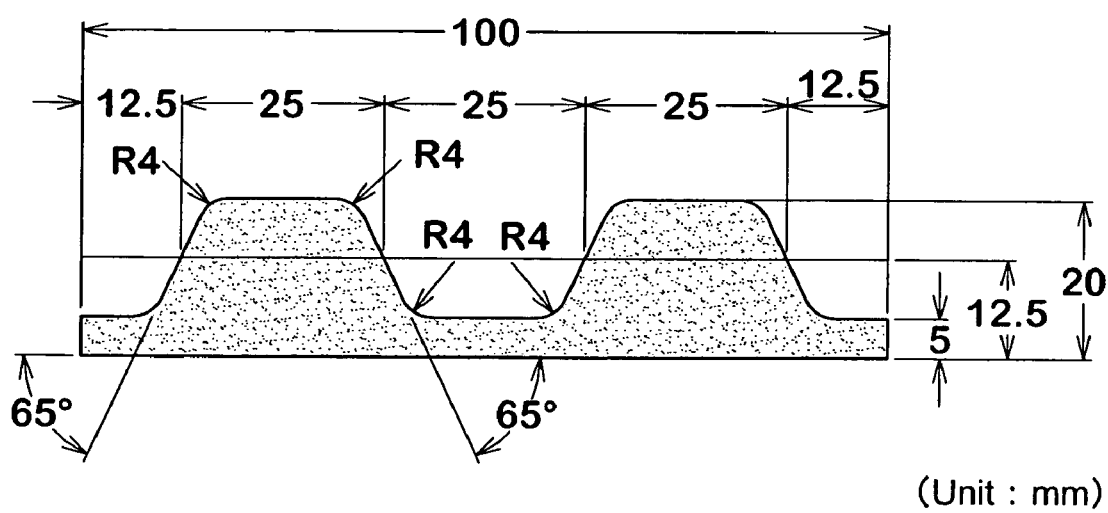
FIG. 7 is a cross sectional view showing an embodiment of the noise damper.

Noise Damper
Material: ether-based polyurethane sponge (ESH2 made by Inoac Corp.)
Specific gravity: 0.039
Cross section shape: as shown in FIG. 7
Cross-sectional area: 1250 mm$^2$
Width: 100 mm
Length of tire in circumferential direction: 1840 mm (Both ends are cut at taper angle of 45 degrees)
Fixing method: A rod-like noise damper was curved along a tread region of the inner surface of the tire and attached by using a double-coated adhesion tape ("5000NS" made by Nitto Denko Corp.). The double-coated adhesion tape has the same size as the bottom surface of the noise damper.

The height, the width and the virtual cross-sectional area of the projecting stripe are as described in Table 1. Test method is as follows.

Figure 8:
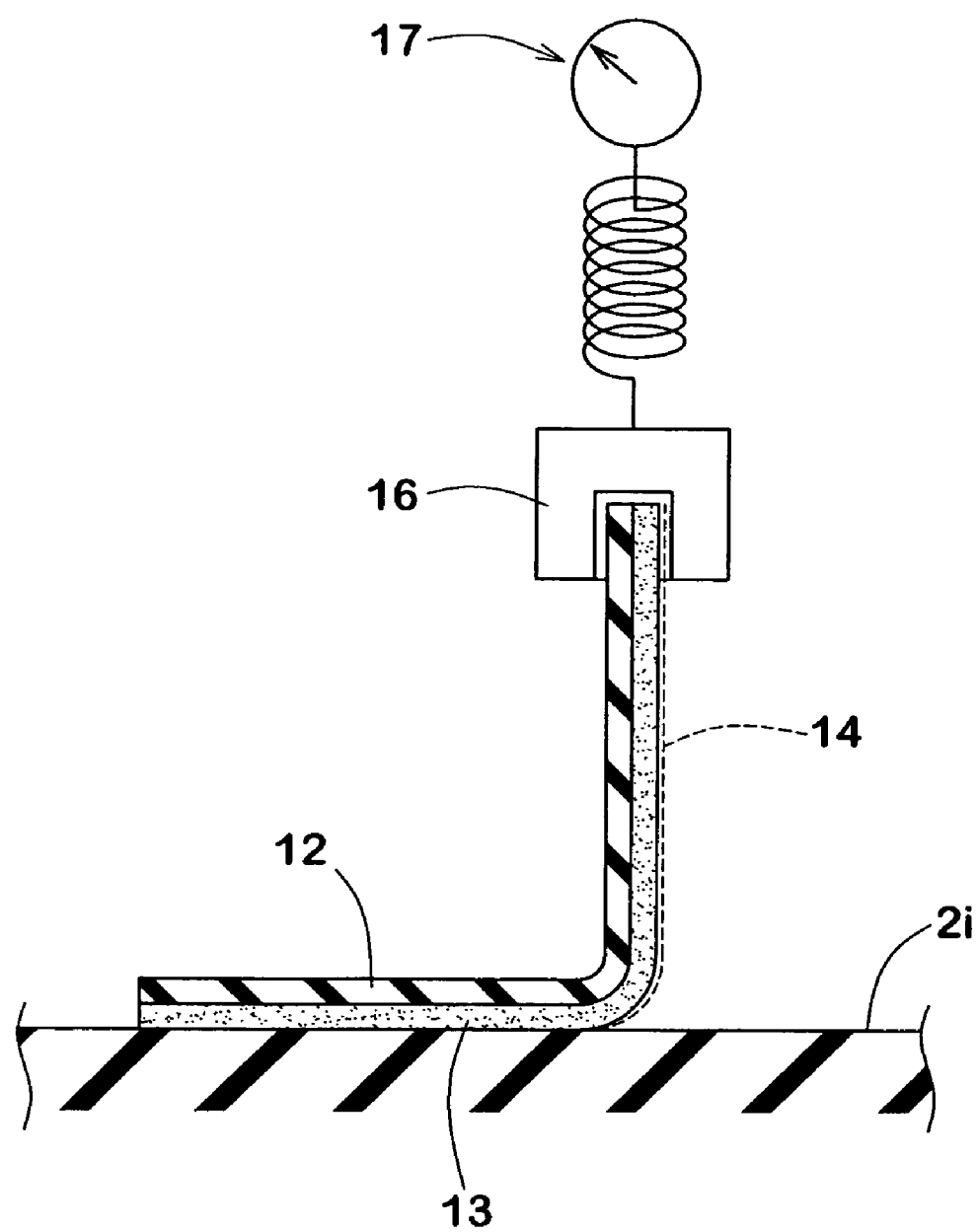
FIG. 8 is a cross sectional view showing an adhered test of the noise damper.
Figure 9A:
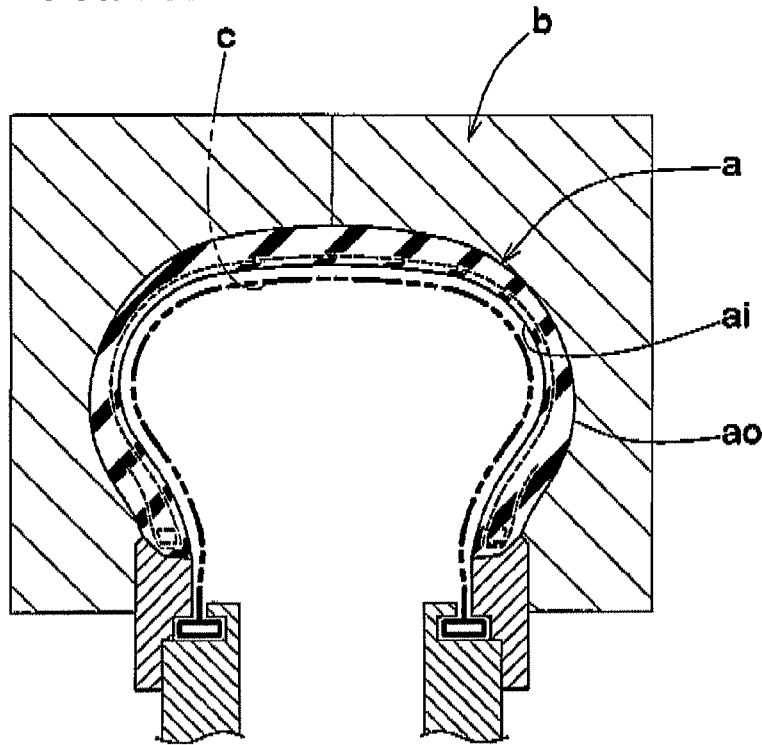
FIG. 9(A) is a cross sectional view showing a vulcanization step for tire.
Figure 9B:
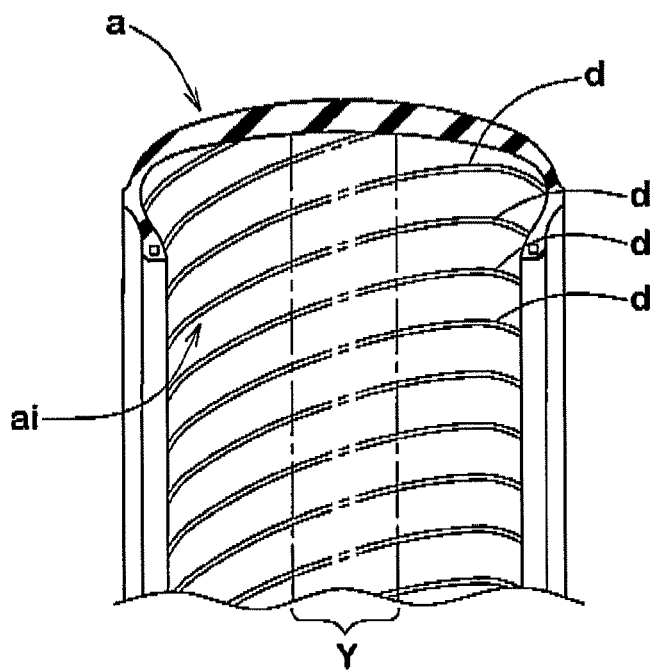
FIG. 9(B) is an inside view of a pneumatic tire.

Durability:
Each test assembly was mounted on the wheel rims, they were made to run on a drum test machine under the following conditions for 6,000 km and 12,000 km, and presence and absence of exfoliation of the noise dampers were checked visually. Tires having exfoliation are shown with "Good", and tires having exfoliation are shown with "No good".
Internal pressure: 230 kPa
Tire load: 6.2 kN
Running speed: 80 km/h
Diameter of drum: 1.7 m Adhesion of Noise Damper:
As shown in FIG. 8, a general rubber sheet 12 having a width of 100 mm, a length of 60 mm and a thickness of 1 mm was attached on the adhesion region Y of the inner surface 2i of each pneumatic tire by means of the double-coated adhesion tape 13. The double-coated adhesion tape 13 is provided at its one end with a non-adhering region. The non-adhering region is not adhered to the inner surface 2i by means of a piece 14 of paper and the length of the non-adhering region is 30 mm. A chuck apparatus 16 grasps the non-adhering region together with the rubber sheet 12, they are stretched at right angles with respect to the inner surface 2i, and a load at which the double-faced tape 13 starts falling off was measured by an electronic spring scale 17. Evaluations are shown with indices in which the example 1 is 100. As the numeric value is higher, the adhesion is stronger and the result is more excellent.

Forming Properties of Pneumatic Tire:
Twenty pneumatic tires were vulcanized for each of the examples and references, presence and absence of molding failure (recess caused by remaining air) of the inner surface of the tire were checked, and evaluations are shown with indices in which the failure ratio of the example 1 is 100. As the numeric value is smaller, the result is more excellent.

The results and the like of the test are shown in Table 1. As the result of the test, it can be confirmed that the assemblies of the examples have enhanced adhesion of the noise dampers while preventing the molding failure of the tire.

TABLE 1

|  |  | Ref. 1 | Ref. 2 | Ref. 3 | Ref. 4 | Ref. 5 | Ref. 6 | Ex. 1 | Ex. 2 | Ex. 3 |
|---|---|---|---|---|---|---|---|---|---|---|
| CW/SW (%) |  | 100 | 20 | 20 | 20 | 20 | 20 | 20 | 50 | 70 |
| First projecting stripe | Width BW1 (mm) | 1.0 | 0.3 | 1.7 | 1.0 | 1.0 | 1.6 | 1.0 | 1.0 | 1.0 |
|  | Height BH1 (mm) | 1.0 | 1.0 | 1.0 | 0.1 | 1.1 | 1.0 | 1.0 | 1.0 | 1.0 |
|  | Virtual cross sectional area BW1 × BH1 (mm$^2$) | 1.0 | 0.3 | 1.0 | 0.1 | 1.1 | 1.6 | 1.0 | 1.0 | 1.0 |
|  | Angle α (deg) | 60 | 60 | 60 | 60 | 60 | 60 | 60 | 60 | 60 |

TABLE 1-continued

|  |  |  |  |  |  |  |  |  |  |  |  |
|---|---|---|---|---|---|---|---|---|---|---|---|
| Second projecting stripe | Main projecting stripe | Width BW2 (mm) | 1.0 | 0.3 | 1.7 | 1.0 | 1.0 | 1.6 | 1.0 | 1.0 | 1.0 |
|  |  | Height BH2 (mm) | 1.0 | 1.0 | 1.0 | 0.1 | 1.1 | 1.0 | 1.0 | 1.0 | 1.0 |
|  |  | Virtual cross-sectional area BW2 × BH2 (mm$^2$) | 1.0 | 0.3 | 1.0 | 0.1 | 1.1 | 1.6 | 1.0 | 1.0 | 1.0 |
|  |  | Angle α (deg) | 60 | 60 | 60 | 60 | 60 | 60 | 60 | 60 | 60 |
|  | Subsidiary projecting stripe | Width BW3 (mm) | — | — | — | — | — | — | — | — | — |
|  |  | Height BH3 (mm) | — | — | — | — | — | — | — | — | — |
|  |  | Virtual cross-sectional area BW3 × BH3 (mm$^2$) | — | — | — | — | — | — | — | — | — |
|  |  | Angle α (deg) | — | — | — | — | — | — | — | — | — |
|  |  | PL/SW (%) | 0 | 0 | 0 | 0 | 0 | 0 | 0 | 0 | 0 |
| Test result |  | Durability (6000 km) | Good | Good | Good | Good | Good | No good | Good | Good | Good |
|  |  | Durability (12000 km) | Good | Good | Good | No good | Good | — | Good | Good | Good |
|  |  | Adhesion (index) | 140 | 105 | 71 | 119 | 83 | 49 | 100 | 108 | 118 |
|  |  | Molding properties (failure ratio) (index) | 118 | 184 | 97 | 192 | 100 | 99 | 100 | 103 | 105 |

|  |  |  | Ex. 4 | Ex. 5 | Ex. 6 | Ex. 7 | Ex. 8 | Ex. 9 | Ex. 10 | Ex. 11 | Ex. 12 | Ex. 13 |
|---|---|---|---|---|---|---|---|---|---|---|---|---|
| CW/SW (%) |  |  | 80 | 90 | 20 | 20 | 20 | 20 | 20 | 20 | 20 | 20 |
| First projecting stripe |  | Width BW1 (mm) | 1.0 | 1.0 | 0.4 | 1.0 | 1.0 | 1.0 | 1.0 | 1.0 | 1.0 | 1.0 |
|  |  | Height BH1 (mm) | 1.0 | 1.0 | 0.2 | 1.0 | 1.0 | 1.0 | 1.0 | 1.0 | 1.0 | 1.0 |
|  |  | Phantom cross-sectional area BW1 × BH1 (mm$^2$) | 1.0 | 1.0 | 0.08 | 1.0 | 1.0 | 1.0 | 1.0 | 1.0 | 1.0 | 1.0 |
|  |  | Angle α (deg) | 60 | 60 | 60 | 30 | 45 | 90 | 60 | 60 | 60 | 60 |
| Second projecting stripe | Main projecting stripe | Width BW2 (mm) | 1.0 | 1.0 | 0.4 | 1.0 | 1.0 | 1.0 | 1.0 | 1.0 | 1.0 | 1.0 |
|  |  | Height BH2 (mm) | 1.0 | 1.0 | 0.2 | 1.0 | 1.0 | 1.0 | 1.0 | 1.0 | 1.0 | 1.0 |
|  |  | Phantom cross-sectional area BW2 × BH2 (mm$^2$) | 1.0 | 1.0 | 0.08 | 1.0 | 1.0 | 1.0 | 1.0 | 1.0 | 1.0 | 1.0 |
|  |  | Angle α (deg) | 60 | 60 | 60 | 30 | 45 | 90 | 60 | 60 | 60 | 60 |
|  | Auxiliary projecting stripe | Width BW3 (mm) | — | — | — | — | — | — | 1.0 | 1.0 | 1.0 | 1.0 |
|  |  | Height BH3 (mm) | — | — | — | — | — | — | 1.0 | 1.0 | 1.0 | 1.0 |
|  |  | Phantom cross-sectional area BW3 × BH3 (mm$^2$) | — | — | — | — | — | — | 1.0 | 1.0 | 1.0 | 1.0 |
|  |  | Angle α (deg) | — | — | — | — | — | — | 60 | 60 | 60 | 60 |
|  |  | PL/SW (%) | 0 | 0 | 0 | 0 | 0 | 0 | 20 | 40 | 60 | 80 |
| Test result |  | Durability (6000 km) | Good | Good | Good | Good | Good | Good | Good | Good | Good | Good |
|  |  | Durability (12000 km) | Good | Good | Good | Good | Good | Good | Good | Good | Good | Good |
|  |  | Adhesion (index) | 131 | 136 | 129 | 91 | 96 | 105 | 100 | 100 | 100 | 100 |
|  |  | Molding properties (failure ratio) (index) | 107 | 110 | 104 | 100 | 100 | 100 | 79 | 66 | 48 | 48 |

The invention claimed is:

1. A pneumatic tire and noise damper assembly comprising a pneumatic tire manufactured by vulcanization using an expandable bladder for molding an inner surface of the tire, the bladder having at least one vent groove extending on its outer surface, the inner surface of the tire being provided with at least one projecting stripe molded by the at least one vent groove of the bladder, and a noise damper being attached to the inner surface of the tire and extending in the circumferential direction of the tire, wherein the at least one projecting stripe comprises at least one first projecting stripe extending in an adhesion region to which the noise damper is attached, the at least one first projecting stripe has a height of from 0.2 to 1.0 mm, a width of from 0.4 to 1.6 mm and a virtual cross-sectional area of from 0.08 to 1.00 mm$^2$, and the adhesion region comprises a center region having a smooth surface without projecting stripe and a width of 20 to 95% of the entire width of the adhesion region, and a pair of side regions each being provided with only the at least one first projecting stripe.

2. The pneumatic tire and noise damper assembly according to claim 1, wherein a plurality of first projecting stripes are provided on the inner surface of the tire with a pitch of from 7 to 30 mm, and each first projecting stripe is inclined at an angle of from 30 to 90 degrees with respect to the circumferential direction of the tire.

3. The pneumatic tire and noise damper assembly according to claim 1, wherein the tire includes a carcass and a belt disposed radially outside the carcass in a tread portion, the damper is attached to the inner surface of a tread region which is a region radially inside of the belt, and the at least one projecting stripe comprises a plurality of second projecting stripes extending in regions outside of the adhesion region.

4. The pneumatic tire and noise damper assembly according to claim 3, wherein
the second projecting stripes include
a main projecting stripe connected to the first projecting stripe and extending to the bead portion, and
a subsidiary projecting stripe extending in a direction intersecting with the main projecting stripe.

5. The pneumatic tire and noise damper assembly according to claim 4, wherein
the subsidiary projecting stripe is provided in each tread shoulder region including a normal standing on a tread ground-contacting end, and
the subsidiary projecting stripe is shorter than the main projecting stripe.

6. The pneumatic tire and noise damper assembly according to claim 1, wherein
the noise damper is attached to the inner surface using a tape which has adhesive on both surfaces.

7. A pneumatic tire and noise damper assembly comprising
a pneumatic tire manufactured by vulcanization using an expandable bladder for molding an inner surface of the tire, the bladder having at least one vent groove extending on its outer surface,
the inner surface of the tire being provided with at least one projecting stripe molded by the at least one vent groove of the bladder, and
a noise damper being attached to the inner surface of the tire and extending in the circumferential direction of the tire, wherein
the at least one projecting stripe comprises at least one first projecting stripe extending in an adhesion region to which the noise damper is attached,
the at least one first projecting stripe has a height of from 0.2 to 1.0 mm, a width of from 0.4 to 1.6 mm and a virtual cross-sectional area of from 0.08 to 1.00 mm$^2$, wherein
the tire includes a carcass and a belt disposed radially outside the carcass in a tread portion,
the damper is attached to the inner surface of a tread region which is a region radially inside of the belt, and
the at least one projecting stripe comprises a plurality of second projecting stripes extending in regions outside of the adhesion region and wherein
the virtual cross-sectional area of the first and second projecting stripes are substantially constant and each second projecting stripe has a greater virtual cross-sectional area than that of each first projecting stripe.

8. The pneumatic tire and noise damper assembly according to claim 7, wherein
the second projecting stripes include
a main projecting stripe connected to the first projecting stripe and extending to the bead portion, and
a subsidiary projecting stripe extending in a direction intersecting with the main projecting stripe.

9. The pneumatic tire and noise damper assembly according to claim 8, wherein
the subsidiary projecting stripe is provided in each tread shoulder region including a normal standing on a tread ground-contacting end, and
the subsidiary projecting stripe is shorter than the main projecting stripe.

10. The pneumatic tire and noise damper assembly according to claim 7, wherein
the noise damper is attached to the inner surface using a tape which has adhesive on both surfaces.

* * * * *